(12) United States Patent
Kim et al.

(10) Patent No.: US 11,330,342 B2
(45) Date of Patent: May 10, 2022

(54) METHOD AND APPARATUS FOR GENERATING CAPTION

(71) Applicant: NCSOFT Corporation, Seoul (KR)

(72) Inventors: Byungju Kim, Seongnam-si (KR);
Songhee So, Seongnam-si (KR);
Euijoon Son, Seongnam-si (KR);
Seungjoon Ahn, Seongnam-si (KR);
Sungyoung Yoon, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 144 days.

(21) Appl. No.: 16/429,587

(22) Filed: Jun. 3, 2019

(65) Prior Publication Data
US 2019/0373336 A1 Dec. 5, 2019

(30) Foreign Application Priority Data
Jun. 4, 2018 (KR) .......................... 10-2018-0064266

(51) Int. Cl.
| | |
|---|---|
| *G10L 15/00* | (2013.01) |
| *H04N 21/81* | (2011.01) |
| *G10L 15/22* | (2006.01) |
| *G10L 21/10* | (2013.01) |
| *G10L 25/63* | (2013.01) |
| *G10L 15/26* | (2006.01) |
| *G10L 15/18* | (2013.01) |

(52) U.S. Cl.
CPC .............. *H04N 21/81* (2013.01); *G10L 15/22* (2013.01); *G10L 15/26* (2013.01); *G10L 21/10* (2013.01); *G10L 25/63* (2013.01); *G10L 15/00* (2013.01); *G10L 15/18* (2013.01); *G10L 15/1807* (2013.01); *G10L 15/1815* (2013.01)

(58) Field of Classification Search
None
See application file for complete search history.

(56) References Cited

U.S. PATENT DOCUMENTS

| | | | |
|---|---|---|---|
| 5,647,834 A * | 7/1997 | Ron | .......................... A61B 5/16 |
| | | | 600/23 |
| 7,983,910 B2 * | 7/2011 | Subramanian | ...... G10L 19/0018 |
| | | | 704/250 |

(Continued)

FOREIGN PATENT DOCUMENTS

| | | |
|---|---|---|
| JP | 2003-66991 A | 3/2003 |
| JP | 2004-253923 A | 9/2004 |

(Continued)

OTHER PUBLICATIONS

Communication dated Jun. 25, 2020, issued by the European Patent Office in application No. 19 177 878.6.

(Continued)

*Primary Examiner* — Richard Z Zhu
(74) *Attorney, Agent, or Firm* — Sughrue Mion, PLLC

(57) ABSTRACT

A method and apparatus for generating a caption are provided. The method of generating a caption according to one embodiment comprises: generating caption text which corresponds to a voice of a speaker included in broadcast data; generating reference voice information using a part of the voice of the speaker included in the broadcast data; and (Continued)

generating caption style information for the caption text based on the voice of the speaker and the reference voice information.

18 Claims, 10 Drawing Sheets

(56) References Cited

U.S. PATENT DOCUMENTS

| | | | |
|---|---|---|---|
| 8,983,836 B2* | 3/2015 | Woodward | G10L 15/22 |
| | | | 704/235 |
| 10,121,474 B2* | 11/2018 | Yu | G06F 3/04842 |
| 10,299,008 B1* | 5/2019 | Catalano | H04N 21/4884 |
| 2004/0062364 A1 | 4/2004 | Dezonno et al. | |
| 2007/0208569 A1* | 9/2007 | Subramanian | G10L 19/0018 |
| | | | 704/270 |
| 2011/0157307 A1* | 6/2011 | Hamada | H04N 13/183 |
| | | | 348/43 |
| 2011/0246172 A1* | 10/2011 | Liberman | G06F 40/58 |
| | | | 704/2 |
| 2013/0058471 A1* | 3/2013 | Garcia | H04M 3/42221 |
| | | | 379/202.01 |
| 2013/0141551 A1 | 6/2013 | Kim | |
| 2015/0046148 A1 | 2/2015 | Oh et al. | |
| 2016/0275952 A1* | 9/2016 | Kashtan | G10L 17/22 |
| 2017/0364484 A1* | 12/2017 | Hayes | G06F 40/109 |
| 2018/0253992 A1* | 9/2018 | Koul | H04M 3/42382 |

FOREIGN PATENT DOCUMENTS

| | | |
|---|---|---|
| JP | 2005-65252 A | 3/2005 |
| JP | 2008-83410 A | 4/2008 |
| JP | 2009-159483 A | 7/2009 |
| JP | 2016-110645 A | 6/2016 |
| KR | 1020180038318 A | 4/2018 |
| WO | 03/050696 A1 | 6/2003 |
| WO | 2016/014321 A1 | 1/2016 |
| WO | 2017/159482 A1 | 9/2017 |

OTHER PUBLICATIONS

Communication dated Aug. 18, 2020, issued by the Japan Patent Office in application No. 2019-103517.
Communication dated May 20, 2019 from the Korean Patent Office in application No. 10-2018-0064266.
Extended European Search Report dated Aug. 16, 2019 issued by the European Patent Office in counterpart Application No. 19177878.6.
Office Action dated Feb. 16, 2021 in Japanese Application No. 2019-103517.

* cited by examiner

REFERENCE VOICE INFORMATION

METHOD AND APPARATUS FOR GENERATING CAPTION

CROSS-REFERENCE TO RELATED APPLICATION(S)

This application claims the benefit under 35 USC § 119(a) of Korean Patent Application No. 10-2018-0064266, filed on Jun. 4, 2018, in the Korean Intellectual Property Office, the entire disclosure of which is incorporated herein by reference for all purposes.

BACKGROUND

1. Field

The following description relates to a method and apparatus for generating a caption, and more particularly, to a method and apparatus for generating a caption based on voice information.

2. Description of Related Art

Recently, streaming services are widely used in various industries, such as news, sports, games, user generated contents (UGC), telepresence, and the like.

In addition, broadcasting services are also being actively provided by personal broadcasting producers who provide various fields of broadcasting through smartphones. Personal broadcasting producers and broadcasting service providers have made various attempts to draw viewers' interest in broadcasting, and as a part of such attempts, they produce broadcasting captions.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one general aspect, a method for generating a caption comprises generating caption text which corresponds to a voice of a speaker included in broadcast data; generating reference voice information using a part of the voice of the speaker included in the broadcast data; and generating caption style information for the caption text based on the voice of the speaker and the reference voice information.

The caption style information may comprise control information for controlling at least one of a size, color, font, an output position, rotation, and a special effect of the caption text.

The method may further comprise changing the caption text based on the voice of the speaker and the reference voice information.

The changing of the caption text may comprise adding a predetermined word to the caption text, adding a special character to the caption text, changing one or more words included in the caption text to associated words, or repetitively adding, to the caption text, one or more words included in the caption text.

The method may further comprise generating screen style information based on the voice of the speaker and the reference voice information.

The screen style information may comprise control information for controlling at least one of a size, color, shaking, and a special effect of a video screen on which the caption text is to be displayed.

The generating of the caption style information may comprise generating the caption style information in units of sentence, word, or character of the caption text.

The reference voice information may comprise information related to a voice state of the part of the voice of the speaker included in the broadcast data and the voice state may include at least one of a volume, tone, and emotion of the voice.

The generating of the caption style information may comprise determining a change in voice state of the voice of the speaker based on the reference voice information and generating the caption style information based on the change in voice state.

In another general aspect, an apparatus for generating a caption comprises a communication interface; and a processor configured to: generate caption text which corresponds to a voice of a speaker included in broadcast data, generate reference voice information using a part of the voice of the speaker included in the broadcast data, generate caption style information for the caption text based on the voice of the speaker and the reference voice information.

The caption style information may comprise control information for controlling at least one of a size, color, font, an output position, rotation, and a special effect of the caption text.

The processor may be further configured to change the caption text based on the voice of the speaker and the reference voice information.

The processor may be further configured to add a predetermined word to the caption text, add a special character to the caption text, change one or more words included in the caption text to associated words, or repetitively add, to the caption text, one or more words included in the caption text.

The processor may be further configured to generate screen style information based on the voice of the speaker and the reference voice information.

The screen style information may comprise control information for controlling at least one of a size, color, shaking, and a special effect of a video screen on which the caption text is to be displayed.

The processor may be further configured to generate the caption style information in units of sentence, word, or character of the caption text.

The reference voice information may comprise information related to a voice state of the part of the voice of the speaker included in the broadcast data and the voice state may comprise at least one of a volume, tone, and emotion of the voice.

The processor may be further configured to determine a change in voice state of the voice of the speaker based on the reference voice information and generate the caption style information based on the change in voice state.

Other features and aspects will be apparent from the following detailed description, the drawings, and the claims.

Figure 1:
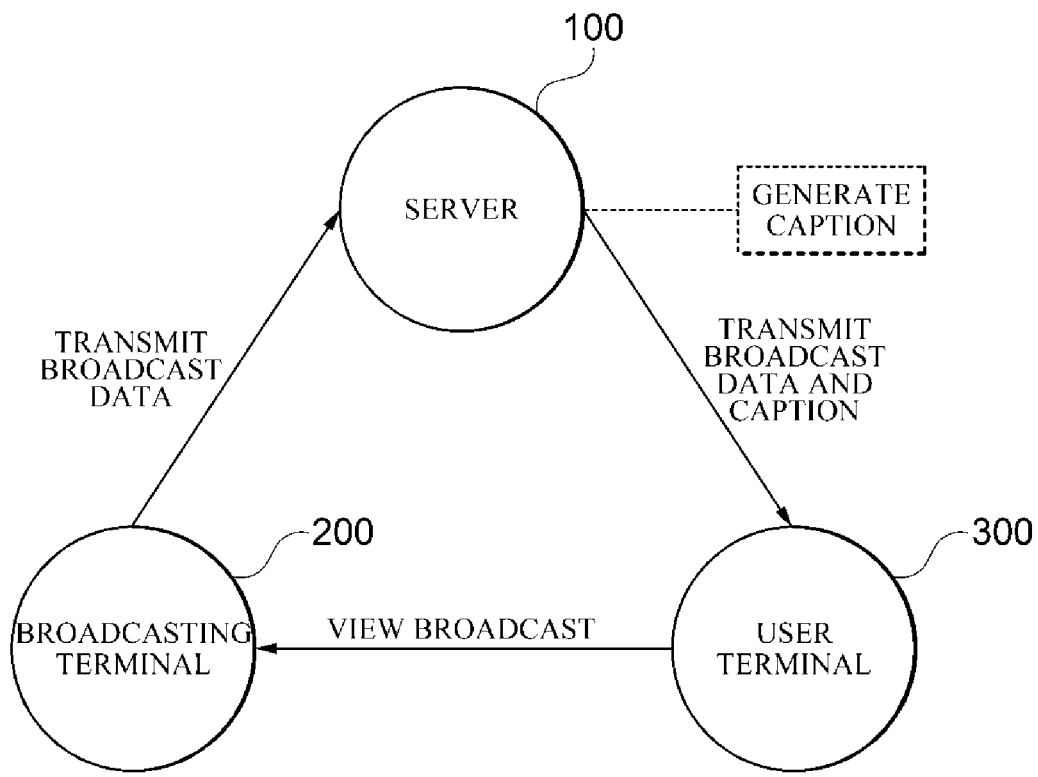
FIG. 1 is a diagram illustrating a configuration of a caption generation system according to one embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, some example embodiments will be described in detail with reference to the accompanying drawings. Like reference numerals in the drawings refer to like elements throughout the present specification. Various modifications may be made to the example embodiments. However, it should be understood that these embodiments are not construed as limited to the illustrated forms and include all changes, equivalents or alternatives within the idea and the technical scope of this disclosure.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprise/include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a diagram illustrating a configuration of a caption generation system 10 according to one embodiment.

Referring to FIG. 1, the caption generation system 10 according to one embodiment may include a server 100, a broadcasting terminal 200, and a user terminal 300.

Communications among various entities included in the caption generation system 10 may be performed through a wired/wireless network (not shown). The wired/wireless network may use standard communication technologies and/or protocols.

The broadcasting terminal 200 may broadcast self-produced contents such, as games, food, news, education, consulting, and the like, or broadcast contents, such as sports, election, and the like, which are pre-produced by other broadcasting entities.

The user terminal 300 may be a terminal of a viewer who views a broadcast produced and/or relayed by the broadcasting terminal 200, or may be a terminal of a viewer who chats or give sponsorship in the broadcast.

The user terminal 300 may be implemented in various forms. For example, the user terminal 300 may be implemented in the form of a mobile terminal, such as a smartphone, a pad-type terminal, such as a smart pad, a variety of types of computers, such as a laptop computer, a wearable device, a TV terminal, or the like.

The server 100 may provide various functions for a broadcasting platform. Broadcasts provided by the server 100 may include pre-produced broadcasts, video-on-demand (VOD), and the like, as well as live broadcasts.

In addition, the broadcasting terminal 200 and the user terminal 300 may, respectively, refer to a viewer account and a broadcasting entity account which are to be provided with functions of the broadcasting platform through the server 100.

The caption generation system 10 according to one embodiment may automatically generate a caption and provide the same to the user. Also, the caption generation system 10 may provide a function for applying various effects to the broadcast captions or a broadcast screen according to a voice state of a speaker.

The server 100 receives broadcast data produced and/or relayed by the broadcasting terminal 200. The broadcast data may include video files, audio files, various setting files, and the like for broadcasting.

The server 100 transmits the broadcast data received from the broadcasting terminal 200 to the user terminal 300. In this case, the server 100 may transmit the broadcast data received from the broadcasting terminal 200 directly the user terminal 300, or may convert the received broadcast data into data suitable for a broadcasting format, such as a live broadcast, a pre-produced broadcast, VOD, and the like and transmit the same. In addition, according to one embodiment, the server 100 may perform various types of processing, such as image editing, image quality improvement, background music addition, and the like, on the broadcast data to be transmitted and transmit the processed broadcast data to the user terminal 300.

Meanwhile, the server 100 may automatically generate a caption of a broadcast voice from the broadcast data. For example, the server 100 may extract a voice from an audio file included in the broadcast data and generate caption text for a corresponding voice by recognizing the extracted voice.

In addition, the server 100 may change at least one of a style of caption text (e.g., the size, color, font, or the like, of the caption text), and a style of the broadcast screen (e.g., the size, color, movement, or the like of the broadcast screen).

The user terminal 300 may output the broadcast data and caption data received from the server 100 to a screen.

According to one embodiment, the user terminal 300 may directly generate caption with some assistance from the server 100 or may autonomously generate caption without communicating with the server 100, which will be described in detail with reference to FIG. 9.

Figure 2:
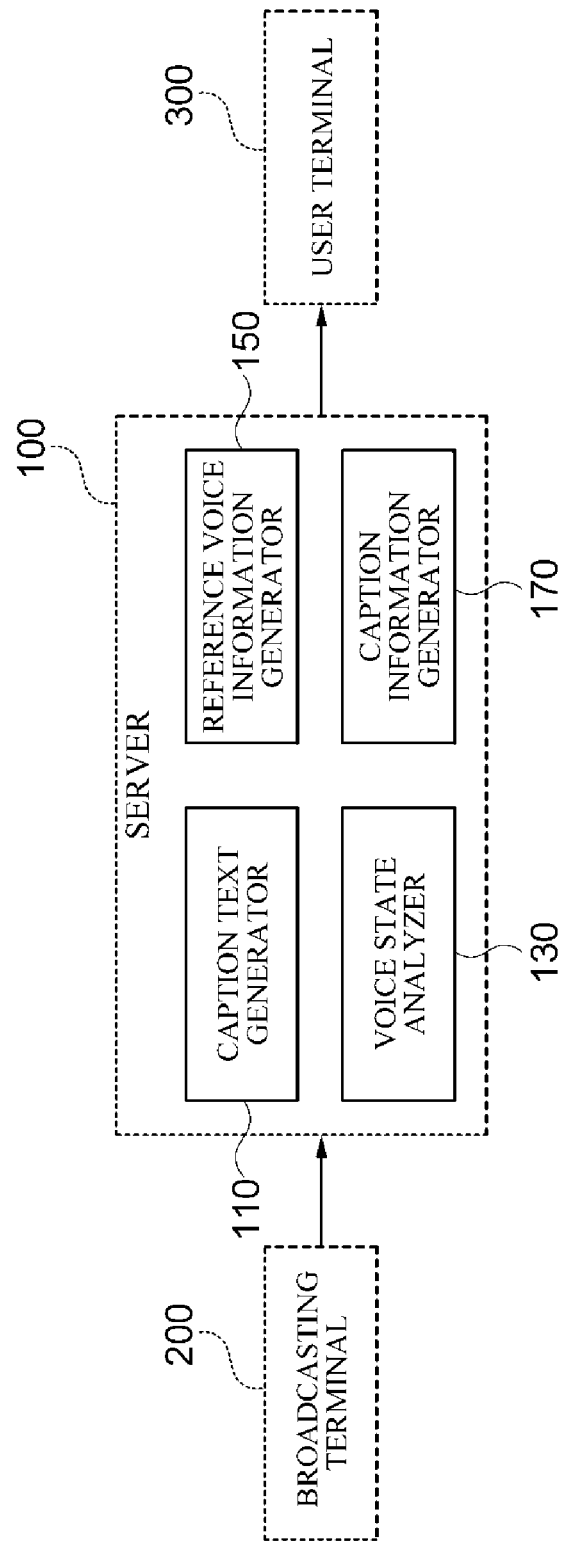
FIG. 2 is a diagram illustrating a configuration of a caption generation server according to one embodiment.

FIG. 2 is a diagram illustrating a configuration of a server 100 according to one embodiment.

Referring to FIG. 2, the server 100 according to one embodiment may be operated by at least one processor and may include a caption text generator 110, a voice state analyzer 130, a reference voice information generator 150, and a caption information generator 170.

Meanwhile, in one embodiment, the caption text generator 110, the voice state analyzer 130, the reference voice information generator 150, and the caption information generator 170 may be implemented using one or more physically separate devices, or may be implemented by one or more processors, or may be implemented by a combination of one or more processors and software, and may not be clearly distinguished in the concrete operation unlike the illustrated embodiment.

The caption text generator 110 generates caption text that corresponds to a voice of a speaker included in broadcast data received from the broadcasting terminal 200.

Specifically, the caption text generator 110 may recognize the speaker's voice included in the broadcast data (a video file or an audio file) received from the broadcasting terminal 200 using a speech recognition technology and generate caption text corresponding to the recognized voice. In this case, the caption text generator 110 may generate the caption text by adding a mark (e.g., "???" or "ooo") to show an inaccurate portion of the speech recognition result.

Meanwhile, the caption text generator 110 provides the generated caption text to the caption information generator 170. The caption information generator 170 generates caption information containing the caption text and transmits the same to the user terminal 300.

The voice state analyzer 130 may analyze a voice state of the speaker's voice included in the broadcast data (video file or audio file). In this case, the voice state may include at least one of a volume of a voice, tone of a voice, and an emotion. The voice state analyzer 130 may utilize various voice analysis technologies to analyze the voice state.

The reference voice information generator 150 generates reference voice information using a part of speaker's voice included in the broadcast data.

According to one embodiment, the reference voice information generator 150 may generate reference voice information based on a voice state related to a voice uttered during a specific time period, which is a part of the speaker's voice included in the broadcast data. For example, the reference voice information generator 150 may generate the reference voice information based on a voice state of a voice that is uttered by the speaker for a preset period of time from the broadcast start time or a voice state of a voice uttered by the speaker for a set period of time according to a request of the broadcasting terminal or the user terminal 300.

The reference voice information may be information serving as a reference for the voice state of the speaker, and may be information related to a voice state of a voice uttered by the speaker at normal times. In one embodiment, the server 100 may detect a change in voice state based on the reference voice information and change the style of the caption and/or the style of a video screen.

The caption information generator 170 may generate caption style information for the caption text based on the voice of the speaker and reference voice information.

Specifically, the caption information generator 170 may determine a caption style to be applied to the caption text for the currently recognized voice (target voice) based on the reference voice information. The caption style is information for decorating the caption text and corresponds to a design style of the caption text.

According to one embodiment, the caption information generator 170 may determine a screen style for a video screen on which the caption text is to be displayed based on the voice of the speaker and the reference voice information. The screen style is information for decorating the video screen at the time of outputting the caption text.

In addition, according to one embodiment, the caption information generator 170 may change the caption text of the voice based on the speaker's voice and the reference voice information. For example, the caption information generator 170 may add a particular word or a special character to the caption text according to the voice state for the voice of the speaker, or change a specific word of the caption text to another word.

In addition, the caption information generator 170 may transmit the caption information including the caption text and the caption style information to the user terminal 300 through a communicator (not shown). In this case, the caption information may further include the screen style information according to some embodiments.

The user terminal 300 which has received the caption information confirms the caption style to be applied to the caption text based on the caption style information, applies the confirmed caption style to the caption text, and outputs the caption text to a screen of the user terminal 300. To this end, a design style for changing a size, color, font, or the like of the caption text according to the caption style information may be stored in the user terminal 300.

In addition, according to one embodiment, when the screen style information is included in the received caption information, the user terminal 300 may confirm the screen style based on the screen style information and control the video screen to which the caption text is output based on the confirmed screen style.

Meanwhile, according to one embodiment, the caption information generator 170 may apply the caption style to the caption text and then transmit a caption layer (caption screen) decorated according to the caption style to the user terminal 300. In this case, the user terminal 300 may overlay the received caption layer (caption screen) on the video screen on which the caption is to be displayed.

Figure 3:
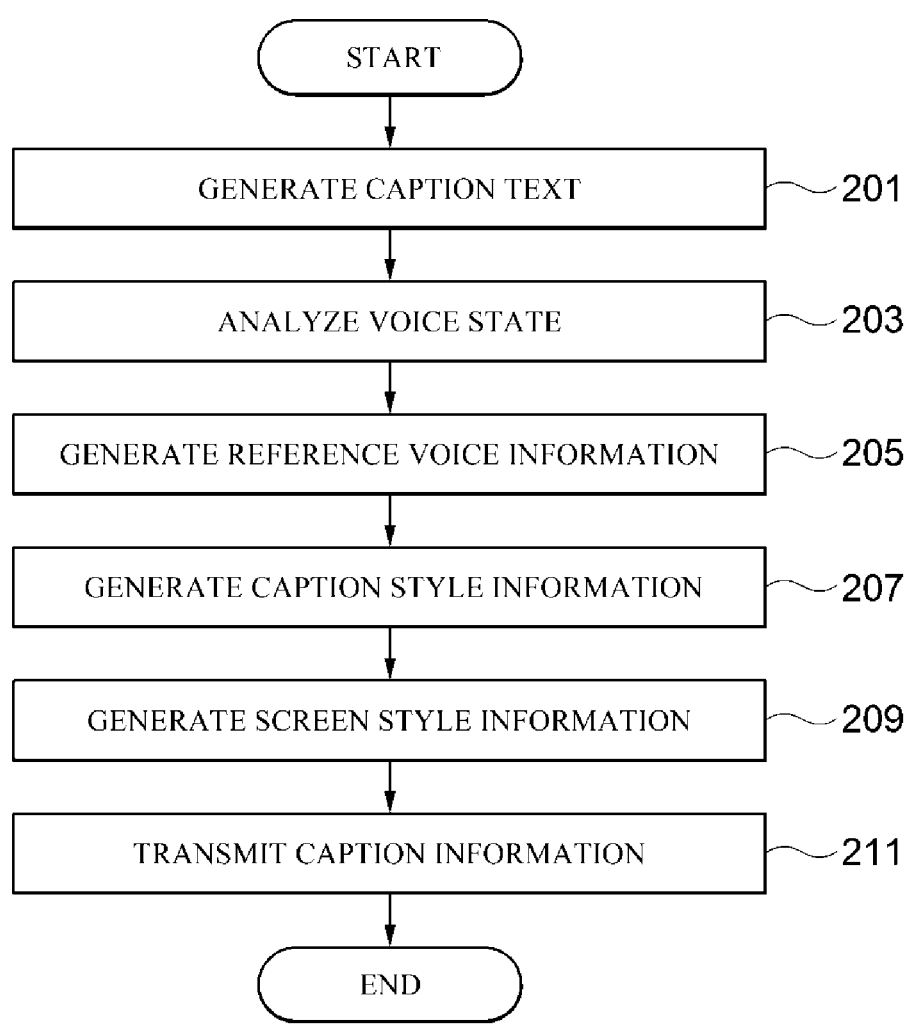
FIG. 3 is a flowchart illustrating a method of generating a caption according to one embodiment.

FIG. 3 is a flowchart illustrating a method of generating a caption according to one embodiment.

Referring to FIG. 3, the method of generating a caption according to one embodiment is a caption generation method performed by a server 100 and comprises extracting caption text (201), analyzing a voice state (203), generating reference voice information (205), generating caption style information (207), generating screen style information (209), and transmitting caption information (211).

In one embodiment, a description will be given based on a single speaker, but in the case of a plurality of speakers, the server 100 may perform the caption generation method for each speaker to generate caption information for each speaker.

First, a caption text generator 110 generates caption text that corresponds to a speaker's voice included in the broadcast data (a video file or an audio file) received from the broadcasting terminal 200 using a speech recognition technology (201).

In this case, as described above, the caption text generator 110 may generate the caption text including a mark (e.g., "???" or "ooo") to show an inaccurate portion of the speech recognition result.

The caption text generator 110 may provide the generated caption text to a caption information generator 170 and the caption information generator 170 may generate caption information containing the caption text and transmit the same to a user terminal 300.

Then, a voice state analyzer 130 analyzes a voice state of the speaker's voice included in the broadcast data (video file or audio file) (203). In this case, the voice state may include a volume of the voice (e.g., decibels), tone of the voice (e.g., soft, rough, slow, quick, etc.), a speaker's emotion (e.g. joy, surprise, sadness, anger, etc.), and the like. The voice state analyzer 130 may use various voice analysis technologies for the voice state analysis.

Then, a reference voice information generator 150 generates reference voice information using a part of the speaker's voice included in the broadcast data (205).

The reference voice information may be information serving as a reference for the voice state of the speaker and may be information related to a voice state of a voice uttered by the speaker at normal times. That is, the reference voice information may be information including a volume, tone, emotion, and the like of a voice uttered by the speaker at normal times.

Meanwhile, the reference voice information generator 150 may use a speaker's voice which is a part of the speaker's voice included in the broadcast data and is uttered for a preset period of time from the broadcast start time as a reference voice for generating the reference voice information. In another example, the reference voice information generator 150 may use a voice which is a part of the speaker's voice included in the broadcast data and is uttered by the speaker for a set period of time according to a request of the broadcasting terminal 200 or the user terminal 300 as a reference voice. In still another example, the reference voice information generator 150 may use a voice which is a part of the speaker's voice included in the broadcast data and is uttered during the occurrence of a specific event (e.g., intermission, an ad, or the like) in the broadcast as a reference voice. As described above, the reference voice information generator 150 may use the voice of the speaker uttered at various times and conditions as the reference voice according to the embodiments.

Figure 4:
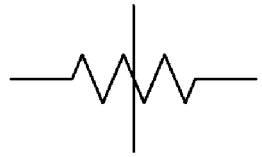
FIG. 4 is a diagram illustrating an example of reference voice information according to one embodiment.

FIG. 4 is a diagram illustrating an example of reference voice information according to one embodiment.

Referring to FIG. 4, reference voice information according to one embodiment may include information on a voice state of a reference voice. In FIG. 4, it can be seen that as the reference voice information, the volume of a reference voice is set to "40 decibels", the tone is set to "soft," and the emotion is set to "neutral."

Referring back to FIG. 3, in one embodiment, the server 100 may detect a change in voice state related to the voice of the speaker based on the reference voice information, and change at least one of the caption style and the video screen style. That is, the server 100 may use a difference between the voice state of the currently recognized voice (target voice) of the speaker and the reference voice information to change at least one of the caption style and the video screen style.

Specifically, the caption information generator 170 may generate caption style information based on the voice of the speaker included in the broadcast data and the reference voice information (207).

The caption style information is information for controlling at least one of the size, color, font, output position, rotation, and special effect of the caption text.

The caption information generator 170 may generate caption style information related to the caption text of a currently recognized voice (target voice) based on a difference between a voice state of the target voice and the reference voice information.

For example, the caption information generator 170 may set the size of the caption text to be increased by 1 point each time the volume of the target voice is increased by a predetermined value in comparison with the volume of the reference voice included in the reference volume information. On the contrary, the caption information generator 170 may set the size of the caption text to be decreased by 1 point each time the volume of the target voice is decreased by a predetermined value in comparison with the volume of the reference voice included in the reference voice information.

In another example, when the emotion of the target voice is different from the emotion of the reference voice included in the reference voice information, the caption information generator 170 may set the color of the caption text differently. That is, the color of the caption text may be set to red when the emotion of the target voice is "anger," set to blue when the emotion is "joy," set to black when the emotion is "fear," and set to grey when the emotion is "sadness." The aforementioned colors associated with the emotions are merely examples and it is apparent that the colors may be changed according to settings of an administrator.

In still another embodiment, when the tone of the target voice is different from the tone of the reference voice included in the reference voice information, the caption information generator 170 may set the font of the caption text differently. That is, when the tone of the target voice is "soft," the font may be set to Myungjo, when the tone is "roughness," the font may be set to Gungseo, and when the tone is "quick," the font may be set to Gothic. Here, the aforementioned fonts associated with the tones are merely examples.

In another example, the caption information generator 170 may set at least one of the output position, rotation, and special effect of the caption text by comparing the volume and emotion of the target voice with the volume and emotion of the reference voice included in the reference voice information. In this case, the special effect may include various visual effects, such as size change, color change, shaking, fade-in/out, movement, and the like of the caption text.

Figure 5:
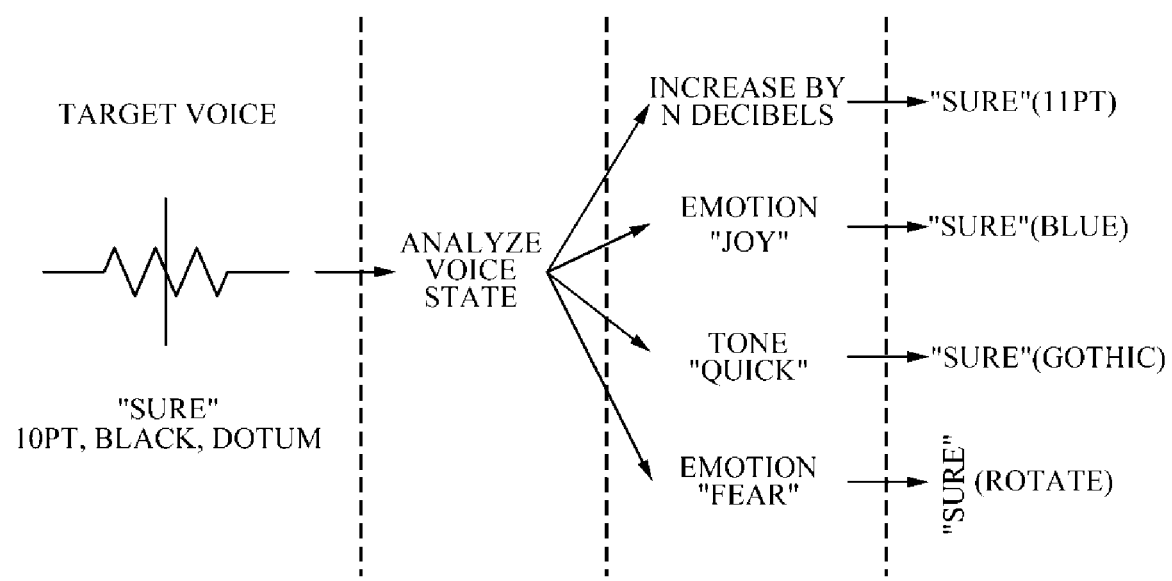
FIG. 5 is a diagram illustrating an example of changing a caption style according to one embodiment.

FIG. 5 is a diagram illustrating an example of changing a caption style change according to one embodiment.

In one embodiment, the caption information generator 170 may generate caption style information such that the style of the caption text can be changed variously by a combination of state information of the target voice. That is, the style of the caption text may be variously changed using a difference in a volume and tone of the target voice, a difference in tone and emotion, or a difference in a volume and emotion.

In addition, the caption information generator 170 may generate the caption style information in a script format and generate the caption style information in various programming language formats, in addition to the script format.

Also, the caption information generator 170 may generate the caption style information in units of sentence, word, or character of the caption text.

Referring back to FIG. 3, the caption information generator 170 generates the screen style information based on the voice of the speaker included in the broadcast data and the reference voice information (209).

The screen style information may be information for controlling at least one of the size, color, shaking, and special effect of the video screen on which the caption text is to be displayed.

On the basis of a difference between a voice state of the currently recognized voice (target voice) and the reference voice information, the caption information generator 170 generates the screen style information for controlling the style (design) of the video screen at a point in time when the caption text corresponding to the target voice is output.

For example, the caption information generator 170 may set the size of the video screen to be increased by 10 pixels each time the volume of the target voice is increased by a predetermined value in comparison with the volume of the reference voice included in the reference voice information. On the contrary, the caption information generator 170 may set the size of the video screen to be decreased by 10 pixels each time the volume of the target voice is decreased by a predetermined value in comparison with the volume of the reference voice included in the reference voice information.

In another example, when the emotion of the target voice is different from the emotion of the reference voice included in the reference voice information, the caption information generator 170 may set the background color of the video screen differently. That is, the background color of the video screen may be set to orange when the emotion of the target voice is "anger," set to sky-blue when the emotion is "joy," set to purple when the emotion is "fear," and set to grey when the emotion is "sadness."

In another example, the caption information generator 170 may set at least one of shaking and a special effect of the video screen by comparing the volume and emotion of the target voice with the volume and emotion of the reference voice included in the reference voice information, respectively. The special effect may include various visual effects, such as size change, color change, shaking, fade-in/out, movement, and the like of the video screen.

Figure 6:
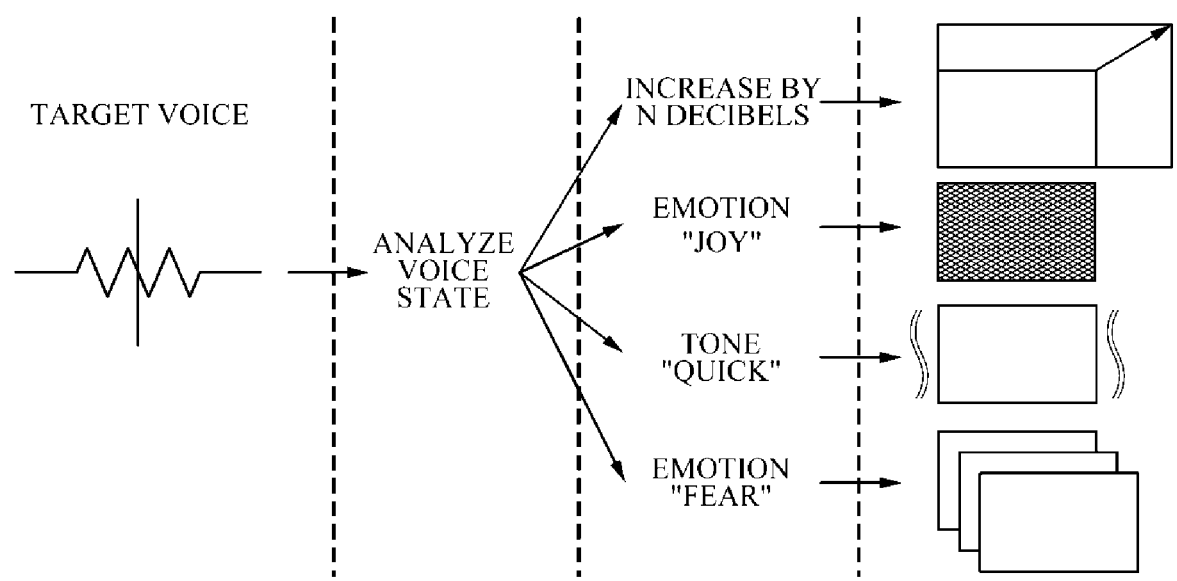
FIG. 6 is a diagram illustrating an example of changing a screen style according to one embodiment.

FIG. 6 is a diagram illustrating an example of changing a screen style according to one embodiment.

According to one embodiment, the caption information generator 170 may generate screen style information such that the style of the video screen by a combination of state information of the target voice.

Meanwhile, the caption information generator 170 may be generate the screen style information in a script format, and may generate the screen style information in various programming language formats, in addition to the script format.

Referring back to FIG. 3, the caption information generator 170 may generate caption information including the caption text and the caption style information and transmit the caption information to the user terminal 300 through a communicator (not shown) (211).

In this case, according to an embodiment, the caption information may further include the screen style information.

The user terminal 300 may output the caption text using the received caption information according to the caption style information.

In addition, the user terminal 300 may output the video screen according to the screen style information when the received caption information includes the screen style information.

Meanwhile, according to one embodiment, the caption information generator 170 may change the style of the caption text corresponding to the target voice or the style of the video screen using the voice state of the target voice and the reference voice information.

Also, according to one embodiment, the caption information generator 170 may change the caption text itself based on the reference voice information.

Figure 7:
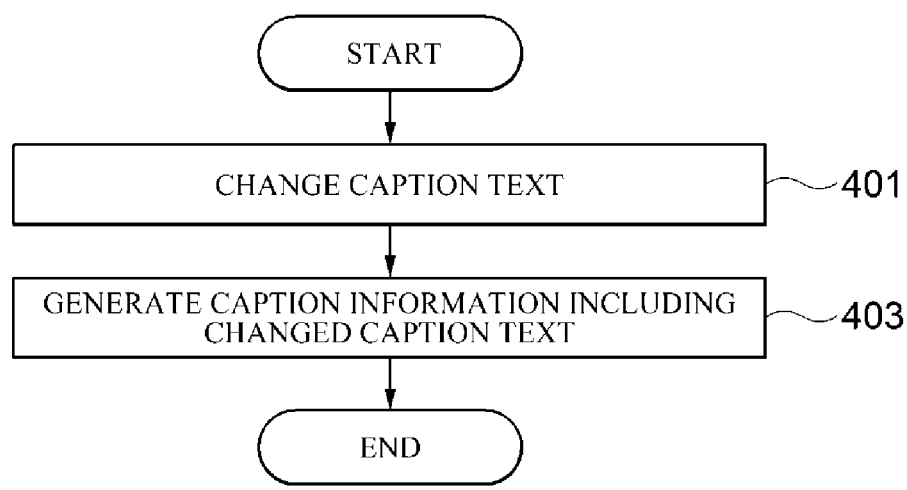
FIG. 7 is a flowchart illustrating a method of changing caption text according to one embodiment.

FIG. 7 is a flowchart illustrating a method of changing caption text according to one embodiment.

Referring to FIG. 7, the caption text change method according to one embodiment includes changing caption text (401) and generating caption information including the changed caption text (403).

First, the caption information generator 170 change the caption text corresponding to a currently recognized voice (target voice) based on a difference between the voice state of the target voice and the reference voice information.

An example of changing the caption text may include (i) adding a predetermined word to the caption text, (ii) adding a special character to the caption text, (iii) changing one or more words included in the caption text to associated words, and (iv) repetitively adding one or more letters included in the caption text.

For example, when the emotion of the target voice differs from the emotion of the reference voice included in the reference voice information, the caption information generator 170 may add a predetermined special character to the caption text. In other words, the caption information generator 170 may add an exclamation mark (!) to the caption text when the emotion of the target voice is "anger," add a heart symbol (♥) when the emotion is "joy," and add an emoticon or letters ("T.T" or the like) representing a crying face.

In another example, the caption information generator 170 may add a predetermined word when the tone of the target voice differs from the tone of the reference voice included in the reference voice information. That is, the caption information generator 170 may add a word "softly" when the tone of the target voice is "soft," and add a word "roughly," when the tone is "rough."

In still another example, the caption information generator 170 may repetitively add, to the caption text, one or more words included in the caption text, add a special character to the caption text, or change one or more words included in the caption text to associated words when the tone of the voice target differs from the tone of the reference voice included in the reference voice information. More specifically, when the tone of the target voice ("go") is "quick," the caption information generator 170 may add a word "go" twice to change the caption text to "go go go." In addition, when the tone of the target voice ("go") is "slow," the caption information generator 170 may add tilde (~) to change the caption text to "go~."

Figure 8:
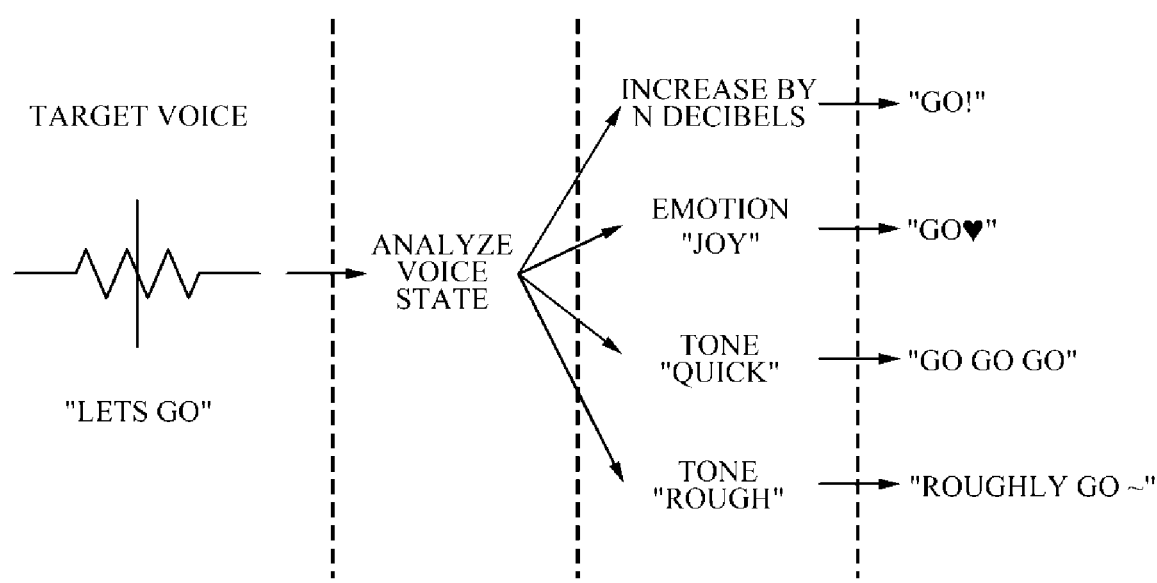
FIG. 8 is a diagram illustrating an example of a method of adding caption text according to one embodiment.

FIG. 8 is a diagram illustrating an example of a method of adding caption text according to one embodiment.

In one embodiment, it is apparent that the caption information generator 170 can change the caption text variously using a combination of state information of the target voice.

Referring back to FIG. 7, the caption information generator 170 generates caption information including the changed caption text (403).

Accordingly, the user terminal 300 outputs the changed caption text to the screen and provides the changed caption to the user.

In the foregoing, it has been described that the caption information generator 170 may set the caption style, the screen style, and change of caption text using the voice state of the target voice and the reference voice information. However, the caption information generator 170 may set one or more of the caption style, the screen style, and the change of caption text according to the change in the voice state of the target voice.

In another embodiment, the user terminal 300 may directly generate a caption with some assistance from the server 100 or may autonomously generate caption without communicating with the server 100.

For example, the server 100 may generate only caption text and provide the same to the user terminal 200, and caption style information and screen style information may be generated in the user terminal 300. In another example, the user terminal 300 may generate not only the caption style information and the screen style information, but also the caption text.

Figure 9:
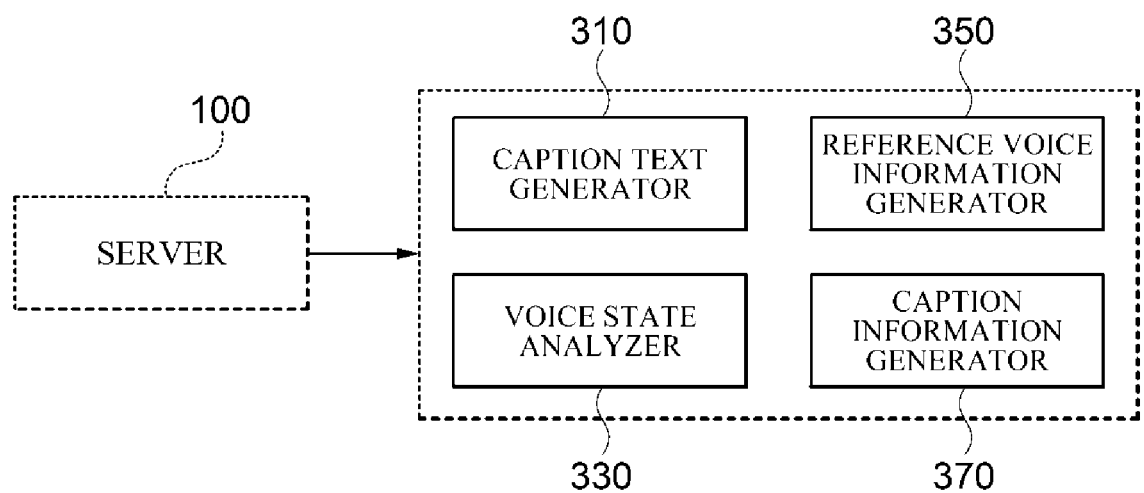
FIG. 9 is a diagram illustrating a configuration of a user terminal which performs a caption generation method according to another embodiment.

FIG. 9 is a diagram illustrating a configuration of a user terminal 300 which performs a caption generation method according to another embodiment. The user terminal 300 according to another embodiment may generate caption text and generate at least one of caption style information and screen style information.

Referring to FIG. 9, the user terminal 300 according to another embodiment may be operated by at least one processor and may include a caption text generator 310, a voice state analyzer 330, a reference voice information generator 350 and a caption information generator 370.

Meanwhile, in one embodiment, the caption text generator 310, the voice state analyzer 330, the reference voice information generator 350 and the caption information generator 370 may be implemented using one or more physically separate devices, or may be implemented by one or more processors, or may be implemented by a combination of one or more processors and software, and may not be clearly distinguished in the concrete operation unlike the illustrated embodiment.

The caption text generator 310, the voice state analyzer 330, the reference voice information generator 350, and the caption information generator 370 which are included in the user terminal 300 may perform the substantially the same functions, respectively, as the caption text generator 110, the voice state analyzer 130, the reference voice information generator 150, and the caption information generator 170 which are included in the above-described server 100.

Meanwhile, the user terminal 300 may perform the caption generation method described above in FIG. 3 to generate caption information including caption text, caption style information, and screen style information and may output the caption text using the caption information and provide the same to a user.

Figure 10:
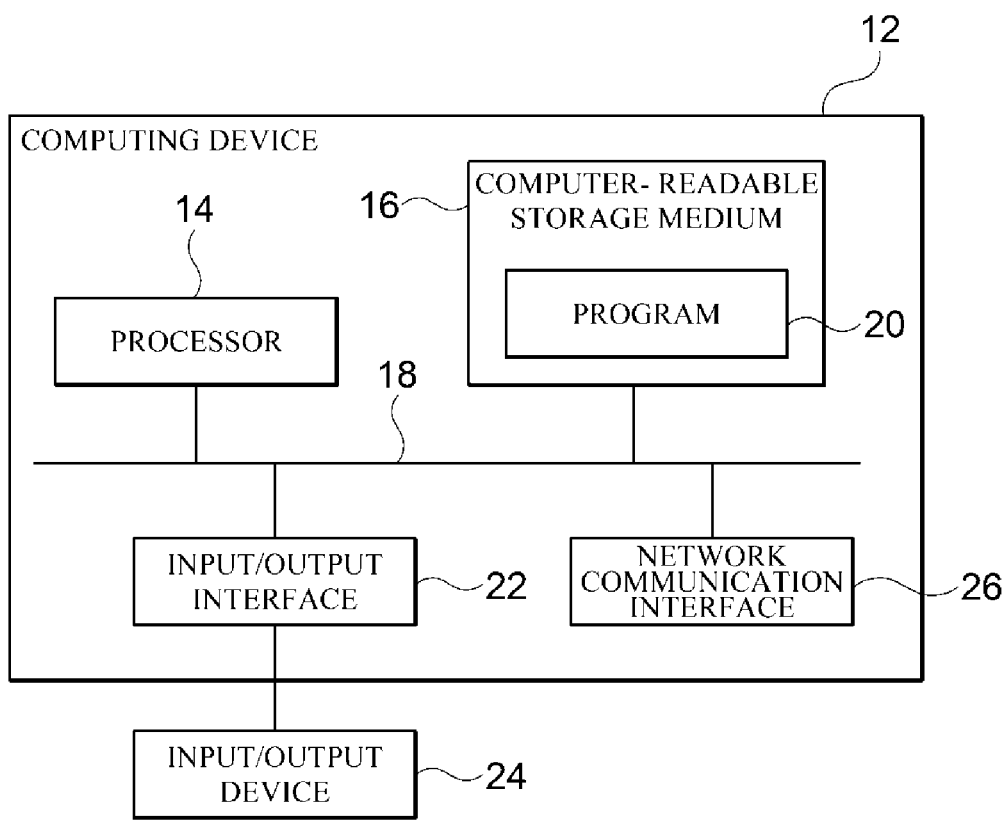
FIG. 10 is a block diagram for describing an example of a computing environment 10 including a computing device suitable to be used in exemplary embodiments.

FIG. 10 is a block diagram for describing an example of a computing environment 10 including a computing device suitable to be used in exemplary embodiments. In the illustrated embodiment, each of the components may have functions and capabilities different from those described hereinafter and additional components may be included in addition to the components described herein.

The illustrated computing environment 1000 comprises a computing device 12. In one embodiment, the computing device 12 may be an audio conference server 102. In addition, the computing device 12 may be one or more components included in the server 100, the broadcasting terminal 200 or the user terminal 300.

The computing device 12 may include at least one processor 14, a computer-readable storage medium 16, and a communication bus 18. The processor 14 may cause the computing device 12 to operate according to the aforementioned exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the illustrative embodiment.

The computer-readable storage medium 16 is configured to store computer executable commands and program codes, program data and/or information in other suitable forms. The programs stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

The units and/or modules described herein may be implemented using hardware components, software components, and/or combination of the hardware components and the software components. For example, the apparatuses and the hardware components described herein may be implemented using, for example, a processor, a controller, a central processing unit (CPU), a graphic processing unit (GPU), an arithmetic logic unit (ALU), a digital signal processor, a microcomputer, a field programmable array (FPA), a programmable logic unit (PLU), a microprocessor, an application specific integrated circuit (ASICS) or one or more general-purpose computers or specific-purpose computers such as any other device capable of responding to and executing instructions in a defined manner.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, and DVDs; magneto-optical media such as optical media and floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described hardware devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for generating a caption, comprising:
   generating caption text which corresponds to a voice of a speaker included in broadcast data;
   generating reference voice information by using a reference voice of the speaker, the reference voice being uttered by the speaker during a predetermined time period and included in the broadcast data, the reference voice information comprising information related to a voice state of the reference voice;
   comparing a voice state of a target voice of the speaker with the voice state of the reference voice, included in the reference voice information, and detecting a change in the voice state of the target voice from the voice state of the reference voice; and
   generating caption style information of caption text corresponding to the target voice, based on the detected change in the voice state of the target voice; and
   changing the caption text based on a difference between the voice state of the target voice and the reference voice information, such that a magnitude of a change to the caption text varies according to a relative magnitude, with respect to a predetermined value, of the difference between the voice state of the target voice and the reference voice information,
   wherein each of the voice state of the reference voice and the voice state of the target voice comprises a volume, a tone, and an emotion, and
   wherein the changing the caption text comprises:
   changing a first attribute of the caption text based on the detected change being a change in the volume, changing a second attribute of the caption text based on the detected change being a change in the tone, and changing a third attribute of the caption text based on the detected change being a change in the emotion, the first attribute, the second attribute, and the third attribute being different from each other.

2. The method of claim 1, wherein the caption style information comprises control information for controlling at least one of a size, a color, a font, an output position, a rotation, or a special effect of the caption text corresponding to the target voice.

3. The method of claim 1, wherein the changing of the caption text comprises adding a predetermined word to the caption text, adding a special character to the caption text, changing one or more words included in the caption text to associated words, or repetitively adding, to the caption text, the one or more words included in the caption text.

4. The method of claim 1, further comprising generating screen style information based on the detected change in the voice state of the target voice.

5. The method of claim 4, wherein the screen style information comprises control information for controlling at least one of a size, a color, a shaking, or a special effect of a video screen on which the caption text corresponding to the target voice is to be displayed.

6. The method of claim 1, wherein the generating of the caption style information comprises generating the caption style information in units of a sentence, a word, or a character of the caption text corresponding to the target voice.

7. The method of claim 1, wherein the comparing comprises comparing the volume, the tone, or the emotion of the target voice with a corresponding voice state of the volume, the tone, or the emotion of the reference voice.

8. The method of claim 1, wherein the caption style information comprises control information for controlling a size of the caption text corresponding to the target voice to increase by a certain degree each time the volume of the target voice is increased by a predetermined degree compared with the volume of the reference voice.

9. The method of claim 1, wherein the caption style information comprises control information for changing at least one of a color or a font of the caption text corresponding to the target voice based on at least one of the tone or the emotion of the target voice being different from a corresponding voice state of the tone or the emotion of the reference voice.

10. The method of claim 1, wherein the changing the caption text comprises changing a size of the caption text to increase by a first predetermined degree each time the relative magnitude, with respect to the predetermined value, of the difference between the voice state of the target voice and the reference voice information increases by a second predetermined degree.

11. The method of claim 1, wherein the changing the caption text comprises changing a size of the caption text to decrease by a first predetermined degree each time the relative magnitude, with respect to the predetermined value, of the difference between the voice state of the target voice and the reference voice information decreases by a second predetermined degree.

12. An apparatus for generating a caption, comprising:
   a communication interface; and
   a processor configured to:
   generate caption text which corresponds to a voice of a speaker included in broadcast data;
   generate reference voice information by using a reference voice of the speaker, the reference voice being uttered by the speaker during a predetermined time period and included in the broadcast data, the reference voice information comprising information related to a voice state of the reference voice;
   compare a voice state of a target voice of the speaker with the voice state of the reference voice, included in the reference voice information, and detect a change in the voice state of the target voice from the voice state of the reference voice; and
   generate caption style information of caption text corresponding to the target voice, based on the detected change in the voice state of the target voice; and change the caption text based on a difference between the voice state of the target voice and the reference voice information, such that a magnitude of a change to the caption text varies according to a relative magnitude, with respect to a predetermined value, of the difference between the voice state of the target voice and the reference voice information, wherein each of the voice state of the reference voice and the voice state of the target voice comprises a volume, a tone, and an emotion, and wherein the changing the caption text comprises:

changing a first attribute of the caption text based on the detected change being a change in the volume, changing a second attribute of the caption text based on the detected change being a change in the tone, and changing a third attribute of the caption text based on the detected change being a change in the emotion, the first attribute, the second attribute, and the third attribute being different from each other.

13. The apparatus of claim 12, wherein the caption style information comprises control information for controlling at least one of a size, a color, a font, an output position, a rotation, or a special effect of the caption text corresponding to the target voice.

14. The apparatus of claim 12, wherein the processor is further configured to add a predetermined word to the caption text, add a special character to the caption text, change one or more words included in the caption text to associated words, or repetitively add, to the caption text, the one or more words included in the caption text.

15. The apparatus of claim 12, wherein the processor is further configured to generate screen style information based on the detected change in the voice state of the target voice.

16. The apparatus of claim 15, wherein the screen style information comprises control information for controlling at least one of a size, a color, a shaking, or a special effect of a video screen on which the caption text corresponding to the target voice is to be displayed.

17. The apparatus of claim 12, wherein the processor is further configured to generate the caption style information in units of a sentence, a word, or a character of the caption text corresponding to the target voice.

18. The apparatus of claim 12, wherein the processor is further configured to compare the volume, the tone, or the emotion of the target voice with a corresponding voice state of the volume, or tone, and the emotion of the reference voice.

* * * * *